United States Patent
An et al.

(10) Patent No.: US 6,693,638 B1
(45) Date of Patent: Feb. 17, 2004

(54) DATA PROCESSING METHOD USING COMBINED SOFTWARE/HARDWARE SCHEME AND APPARATUS FOR THE SAME

(75) Inventors: Cheol-Hong An, Suwon (KR); Kang-wook Chun, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/545,837

(22) Filed: Apr. 10, 2000

(30) Foreign Application Priority Data

May 13, 1999 (KR) .............................. 99-17162

(51) Int. Cl.[7] ............................ G06F 15/16; G09G 5/02
(52) U.S. Cl. ..................... 345/503; 345/520; 345/531; 345/601; 345/604; 348/569; 348/558
(58) Field of Search ................................ 345/503, 520, 345/531, 536, 601, 604; 348/563, 569, 725, 726, 731, 554, 557, 558

(56) References Cited

U.S. PATENT DOCUMENTS

| | | | | |
|---|---|---|---|---|
| 6,084,637 A | * | 7/2000 | Oku et al. ................. | 348/445 |
| 6,118,494 A | * | 9/2000 | Knox et al. ............... | 348/569 |
| 6,175,388 B1 | * | 1/2001 | Knox et al. ............... | 348/569 |
| 6,351,292 B1 | * | 2/2002 | Knox et al. ............... | 348/569 |
| 6,366,731 B1 | * | 4/2002 | Na et al. ................... | 386/83 |
| 6,480,238 B1 | * | 11/2002 | Knox et al. ............... | 348/569 |
| 6,483,553 B1 | * | 11/2002 | Jung ......................... | 348/731 |

* cited by examiner

Primary Examiner—Ulka J. Chauhan
(74) Attorney, Agent, or Firm—Sughrue Mion, PLLC

(57) ABSTRACT

A data processing method and an apparatus thereof, which process EIA-775 OSD graphic data received from the outside based on IEEE 1394 standards by using a combined software/hardware method. The data processing apparatus using a combined software/hardware method includes a first data processor, in response to an interrupt control signal, for analyzing predetermined data among graphic data received from the outside based on IEEE 1394 standards and processing the same to output control data, a second data processor for outputting an interrupt control signal to process the predetermined data when the graphic data is received from the outside based on IEEE 1394 standards, and for calculating a destination address and the size of graphic data excluding the predetermined data to be output according to the control data, and a graphic processor for mixing video data with the graphic data, of which the destination address and the size are calculated. A system bandwidth and the size of a chip can be reduced, and easy modification and debugging can be realized.

10 Claims, 5 Drawing Sheets

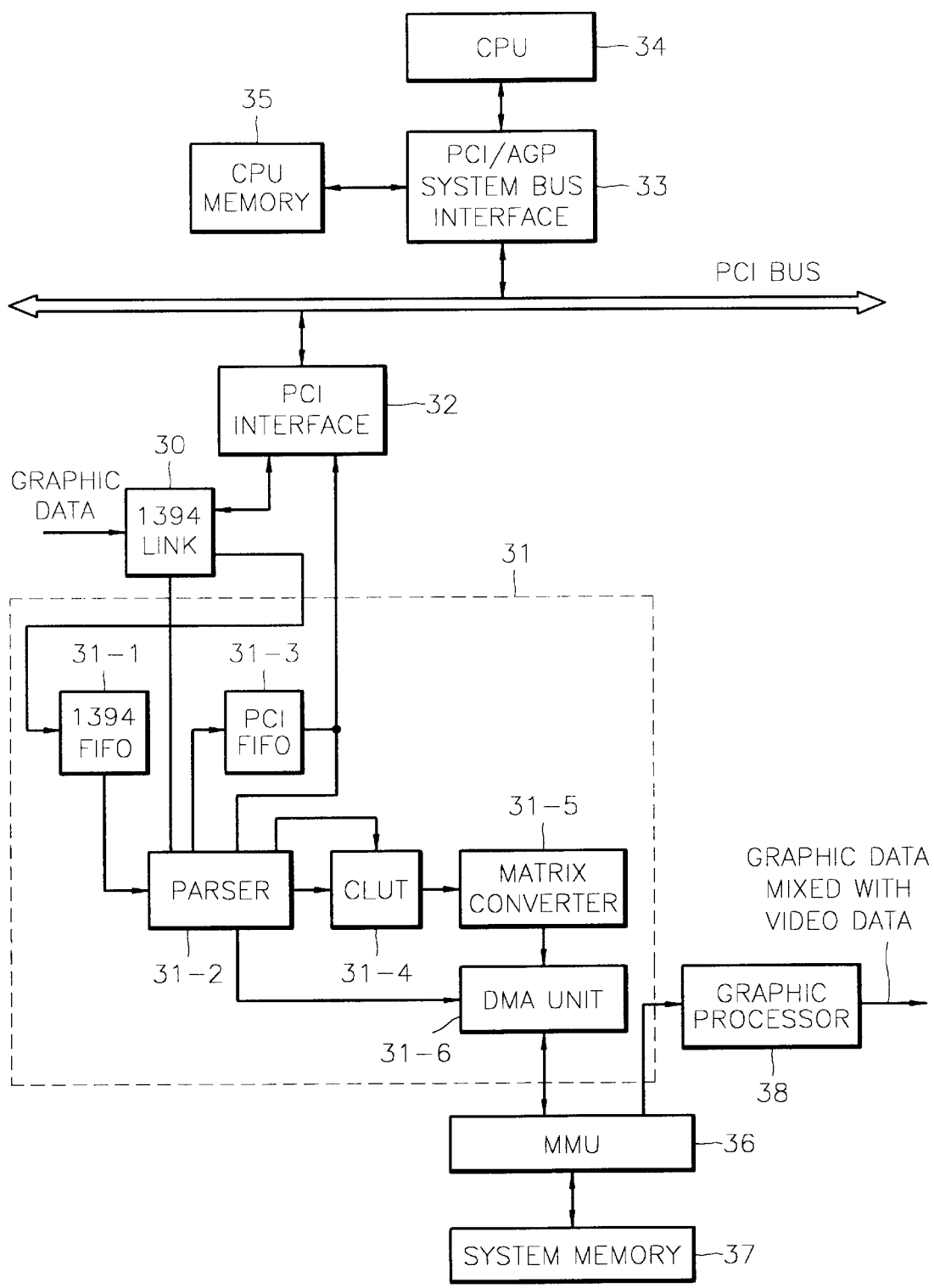

DATA PROCESSING METHOD USING COMBINED SOFTWARE/HARDWARE SCHEME AND APPARATUS FOR THE SAME

BACKGROUND OF THE INVENTION

1. Field of the Invention

The present invention relates to a data processing method and an apparatus for the same, and more particularly, to a data processing method which processes electronic industries alliance-775 on screen display (EIA-775 OSD) graphic data, which is received from the outside based on IEEE 1394 standards, by using a combined software/hardware method.

2. Description of the Related Art

FIG. 1 shows a configuration of a conventional data processing apparatus which employs a software method.

EIA-775 OSD graphic data, which is received from the outside through a 1394 link 10, is transmitted by a peripheral component interconnect (PCI) interface 11 to a standard PCI system bus. The EIA-775 OSD graphic data, which has been transmitted to the PCI bus, is recorded in an SDRAM which is a CPU memory 13 by way of a peripheral component interconnect/accelerated graphics port (PCI/AGP) system bus interface 12. Data having a variable length defined as a frame in EIA-775 is sequentially recorded in the CPU memory 13. Each frame consists of subframes whose number is different depending on the OSD data format.

Each subframe is configured with a Set_OSD_pixel_format, a 4_bit_OSD_data, an 8_bit_OSD_data, an Uncompressed_ 16_bit_data, a Fill_region_with_constant and a clear_OSD. A configuration of each frame is determined by an OSD_layout of a Set_OSD_pixel_format.

For example, in the case of a Set_OSD_pixel_format for 4-bit color data defined in EIA-775, not only a pure OSD pixel data but also various control data such as a bit number per pixel, a pixel type and a color look-up-table (CLUT) are recorded. A CPU 14 processes these data and CLUT data are stored in the CPU memory 13.

A serially received 4_bit_OSD_data includes location and size data of a rectangle to be displayed and real pixel data. The CPU 14 forms a 16-bit OSD pixel by using the pixel data and CLUT and performs color-matrix conversion of these data to record the converted data in the CPU memory 13. Also, the CPU 14 calculates a destination address of a system memory 16, the destination address corresponding to a location value and reads out the OSD data from the CPU memory 13 to store the read data at the destination address of the system memory 16 through the PCI/AGP system bus interface 12, the PCI interface 11 and a memory management unit (MMU) 15. A graphic processor 17 reads out final data after it has passed through the MMU 15, mixes it with video data and generates graphic data mixed with the video data.

FIG. 2 is a block diagram showing a configuration of a conventional data processing apparatus which employs a hardware method.

EIA-775 OSD graphic data provided through a 1394 link 20 from the outside is processed by special hardware, that is, a parser 21, without the assistance of a CPU 25. As the EIA-775 OSD graphic data does not pass through a PCI interface 22 and PCI/AGP system bus interface 23, it does not have any influence on system bandwidth. After the data is processed as above, it is stored directly in a system memory 27 via an MMU 26. A graphic processor 28 reads final data processed by the MMU 26 from the system memory 27, mixes it with video data and generates graphic data mixed with the video data.

The graphic data processing based on the software method illustrated by FIG. 1, requires a wide PCI system bandwidth because the EIA-775 OSD graphic data is processed by the CPU 14 through the PCI interface 11. In other words, in the data processing, the PCI bus serves as a two-way path to and from the CPU 14, resulting in the degradation of system performance.

To prevent the degradation of system performance, system operating frequency must be increased or the system bus must be widened. However, raising the system operating frequency inevitably requires the use of a lot of gate devices to increase the data processing speed. A lot of gate devices occupy a wide area of a chip and cause a long test time and design time because synchronization of operation times is difficult.

Processing the graphic data in the hardware method as shown in FIG. 2 can increase the data processing speed and does not have a negative influence on the system bandwidth because the method does not use the PCI bus which is a system bus. However, since this method analyzes and processes the first two 32 bits of data of Set_OSD_pixel_format, which is complicated, in a hardware manner, additional gates are necessary to configure the hardware and it is difficult to design and to debug it. Furthermore, while a good error correction capability is possible using a software approach, the hardware approach is not good at error correction.

SUMMARY OF THE INVENTION

It is a first object of the present invention to provide a data processing apparatus capable of processing by a combined software/hardware method EIA-775 OSD graphic data which is received from the outside based on IEEE 1394 standards.

It is a second object of the present invention to provide a combined software/hardware data processing method capable of processing EIA-775 OSD graphic data which is received from the outside based on IEEE 1394 standards.

To accomplish the first object, there is provided a data processing apparatus using a combined software/hardware method, including first data processing means, in response to an interrupt control signal, for analyzing predetermined data among graphic data received from the outside based on IEEE 1394 standards and processing the same to output control data, second data processing means for outputting the interrupt control signal to process the predetermined data when the graphic data is provided from the outside based on IEEE 1394 standards, and for calculating a destination address and the size of graphic data excluding the predetermined data to be output according to the control data, and graphic processing means for mixing the graphic data, of which the destination address and the size are calculated with video data.

To accomplish the second object, there is provided a data processing method using a combined software/hardware method, including the steps of generating an interrupt signal to output control data by analyzing predetermined data among graphic data received from the outside based on IEEE 1394 standards and processing the same, calculating a destination address and the size of graphic data received from the outside based on IEEE 1394 standards according to the control data, and storing the size of the graphic data at the calculated destination address of a memory.

BRIEF DESCRIPTION OF THE DRAWINGS

The above objects and other advantages of the present invention will become more apparent by describing in detail preferred embodiments thereof with reference to the attached drawings, in which:

FIG. 3 is a block diagram showing a configuration of a data processing apparatus according to the present invention which uses a combined software/hardware method.

DESCRIPTION OF THE PREFERRED EMBODIMENTS

Figure 1:
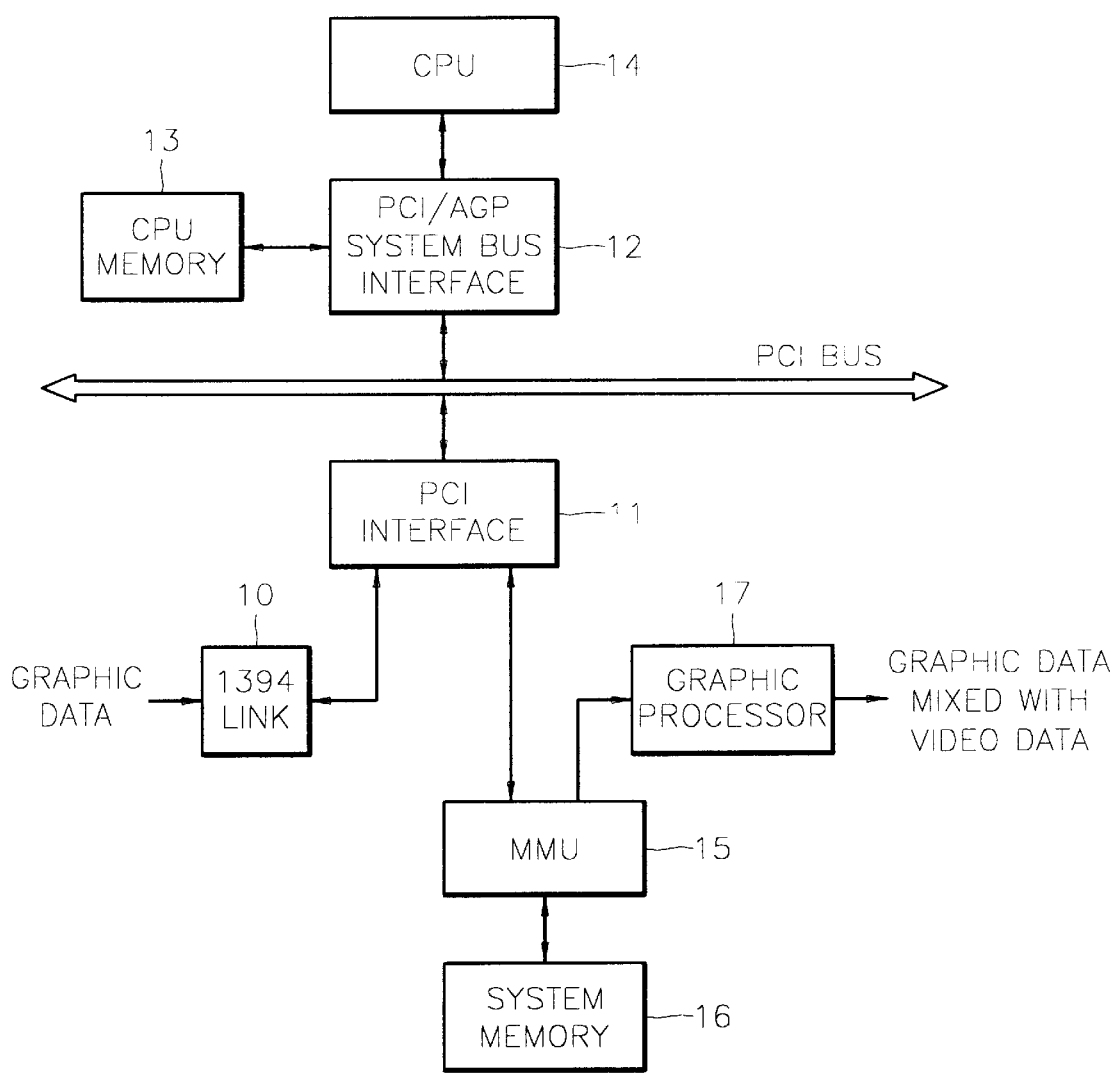
FIG. 1 is a block diagram showing a configuration of a conventional data processing apparatus using a software method.
Figure 2:
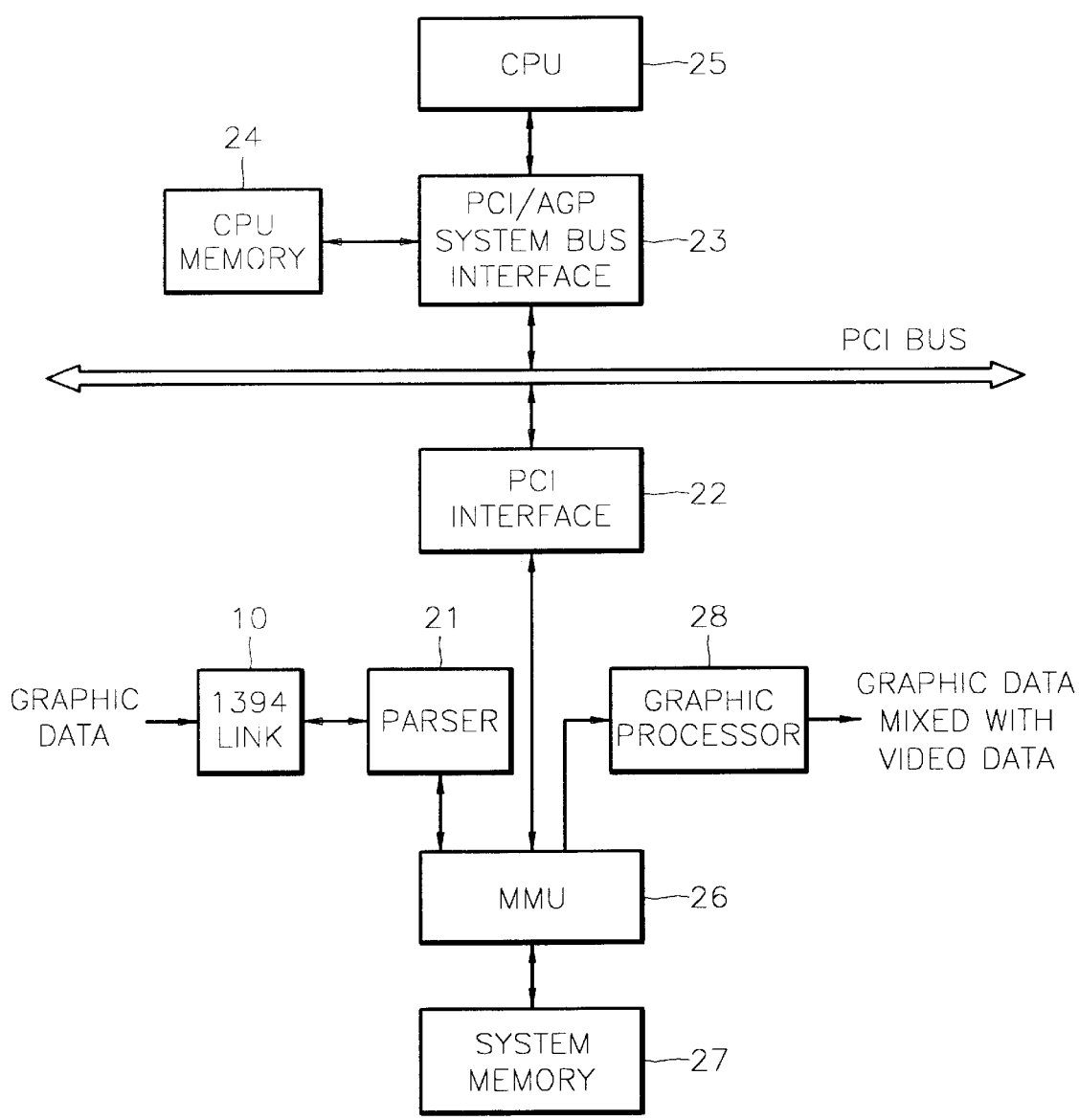
FIG. 2 is a block diagram showing a configuration of a conventional data processing apparatus using a hardware method.

Hereinafter, a preferred embodiment of the present invention will be explained in more detail with reference to the accompanying drawings.

FIG. 3 illustrates a block diagram of a data processing apparatus according to the present invention which uses a combined software/hardware method.

The apparatus shown in FIG. 3 has a 1394 link 30, a data processor 31 for processing and controlling EIA-775 OSD graphic data which is received from the outside via the 1394 link 30, a PCI/AGP system bus interface 33, a CPU 34, a CPU memory 35, an MMU 36, a system memory 37 and a graphic processor 38.

The data processor 31, in the preferred embodiment of the present invention, has a 1394 first-in-first-out (FIFO) circuit 31-1 for storing the EIA-775 OSD graphic data received from the 1394 link 30, a parser 31-2 for processing and controlling the EIA-775 OSD graphic data stored in the 1394 FIFO 31-1, a PCI FIFO 31-3 for storing the first two 32 bits of data of the Set_OSD_pixel_format among the graphic data under the control of the parser 31-2, a CLUT 31-4 in which addresses designating 16-bit data for 4/8-bit data processed by the parser 31-2 are stored, a matrix converter 31-5 for performing color matrix conversion with respect to the data of the CLUT 31-4, and a direct memory access circuit (DMA) 31-6 for controlling the storage of data processed by the parser 31-2 in the system memory 37.

The present invention will now be described in detail with reference to FIG. 3.

The 1394 FIFO 31-1 stores the EIA-775 OSD graphic data which is provided from the outside through the 1394 link 30.

The parser 31-2 reads out the EIA-775 OSD graphic data stored in the 1394 FIFO 31-1 and processes subframes such as Set_OSD_pixel_format, 4_bit_OSD_data, 8_bit_OSD_data Uncompressed_16_bit_data, Fill_region_with_constant and clear_OSD defined by the EIA-775.

In particular, the first two 32 bits of data of Set_OSD_pixel_format which represents the head of a frame are stored in the PCI FIFO 31-3. After completion of the data storage, the parser 31-2 generates an interrupt signal to the CPU 34 through the PCI interface 32 and PCI/AGP system bus interface 33 to process the data stored in the PCI FIFO 31-3.

After the subframe Set_OSD_pixel_format data has been analyzed by the CPU 34, it is stored in a control function register (CFR) (not shown) of the parser 31-2 via the PCI/AGP system bus interface 33 and the PCI interface 32. Data of remaining subframes are processed according to control data of the Set_OSD_pixel_format stored in the CFR of the parser 31-2.

The parser 31-2 performs data processing operations defined by the EIA-775 in accordance with register values stored in the CFR. In a case where the register data stored in the CFR of the parser 31-2 has either a 4-bit or 8-bit color format, the data is downloaded to the CLUT 31-4 and address information for 4/8-bit pixel data is read from the CLUT 314.

The parser 31-2 reads the 4_bit_OSD_data and the 8_bit_OSD_data which are consecutive subframes, from the 1394 FIFO 31-1, and calculates a destination address therefor and the size thereof for recording the same in the system memory 37 to record the calculation result in the CFR of the DMA 31-6. In addition, the parser 31-2 reads OSD pixel data read from 4_bit_OSD_data or 8_bit_OSD_data which is used as addresses of the CLUT 31. The matrix converter 31-5 performs a color space conversion with respect to the OSD pixel data read from the parser 31-2, and the color converted OSD pixel data are stored in a predetermined location of the system memory 37 through the DMA 31-6.

If Set_OSD_pixel_format defined by EIA-775 has a 4-bit or 8-bit pixel format, a CLUT is provided therein. The OSD pixel data contained within the 4_bit_OSD_data or the 8_bit_OSD_data which is subframe is not actual data but has address information which designates 16-bit OSD pixel data stored in the CLUT 31-4. Thus, the CLUT 31-4 can also be called a memory which stores 16-bit OSD pixel data.

The matrix converter 31-5 performs color space conversion between two color spaces, i.e., between the society motion picture & television engineers (SMPTE) 274 m color space and the 2SMPTE170 m color space.

When the data stored in the CFR of the parser 31-2 is in an uncompressed 16-bit format, since there is no need, to use information stored in the CLUT 31-4, the parser 31-2 reads Uncompressed_16_bit_data from the CFR to output the same to the matrix converter 31-5. The matrix converter 31-5 performs color space conversion with respect to the Uncompressed_16_bit_data and then stores it through the DMA 31-6 at a predetermined location of the system memory 37.

When the register data stored in the CFR of the parser 31-2 has OSD data of the Fill/Clear area, the parser 31-2 reads pixel data of Fill_value or zero from the CFR and records an identical value at a predetermined location of the system memory 37 through the DMA 31-6.

The graphic processor 38 reads final data from the system memory 37 via the MMU 36 and mixes it with video data to output the mixed data.

Figure 4A:
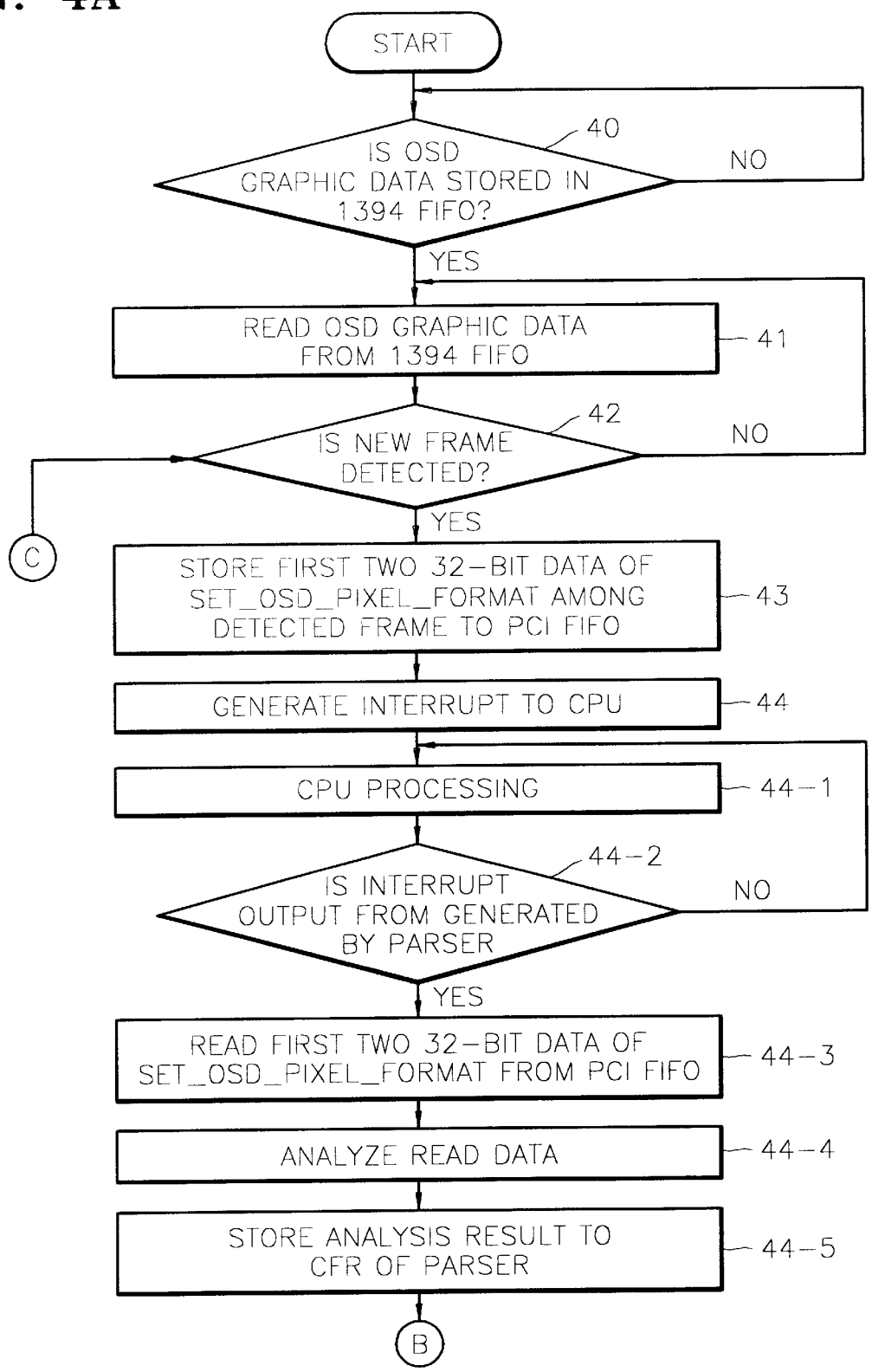
FIGS. 4A and 4B are flowcharts for explaining a data processing method which uses the combined software/hardware method according to the present invention.
Figure 4B:
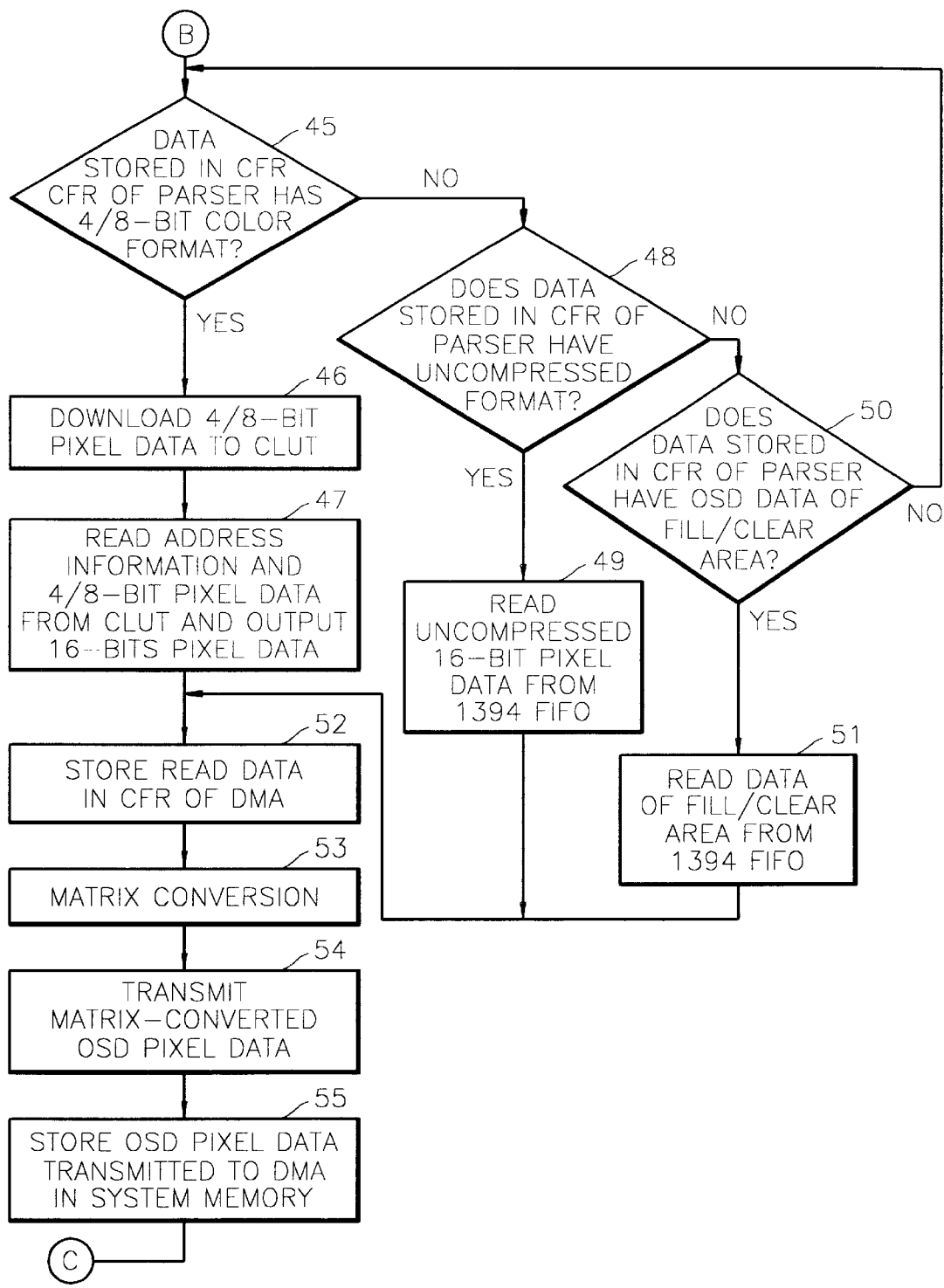

FIGS. 4A and 4B illustrate the flowchart for explaining a data processing method which uses the combined software/hardware method according to the present invention.

Referring to FIGS. 4A and 4B, the data processing method according to the present invention includes the steps of checking whether the OSD graphic data is stored in a 1394 FIFO (step 40), reading the OSD graphic data from the 1394 FIFO (step 41), checking whether a new frame is detected (step 42), storing the first two 32 bits of data of Set_OSD_pixel_format among the detected frames to a PCI FIFO (step 43), generating an interrupt signal to a CPU (step 44), checking whether the data stored in the CFR of a parser has 4/8-bit color format (step 45), reading the 4/8-bit pixel data from the 1394 FIFO to download the read data to the CLUT (step 46), reading an address of the 4/8-bit pixel data from the CLUT and outputting 16-bit pixel data (step 47), checking whether data stored in the CFR of the parser has uncompressed 16-bit pixel format (step 48), reading the uncompressed 16-bit pixel data from the 1394 FIFO (step 49), checking whether the data stored in the CFR of the parser has OSD data of a Fill/Clear area (step 50), reading the data of the Fill/Clear area from the 1394 FIFO (step 51), storing the data read in the steps 47, 49 or 51 to the CFR of a DMA (step 52), performing color matrix conversion (step 53), transmitting the color-matrix-converted OSD pixel data to the DMA (step 54), and storing the OSD pixel data transmitted to the DMA to a system memory (step 55).

In the present invention, the step 44 includes several sub-steps of CPU-processing (sub-step 4-1), checking whether an interrupt signal is generated from the parser (sub-step 4-2), reading first two 32-bit data of Set_OSD_pixel_format from the PCI FIFO (sub-step 44-3), analyzing the read data (sub-step 44-4), and storing an analysis result to the CFR of the parser (sub-step 44-5).

The present invention will now be described in detail with reference to FIGS. 4A and 4B.

If the EIA-775 OSD graphic data which is provided from the outside through the 1394 link is stored in the 1394 FIFO, the OSD graphic data is read from the 1394 FIFO (steps 40 and 41).

When a new frame is detected due to reading the OSD graphic data, the first two 32 bits of data of Set_OSD_pixel_format among the detected frames is stored to the PCI FIFO (steps 42 and 43).

When storage of data in the PCI FIFO is finished, an interrupt signal is generated and provided to the CPU (step 44).

The CPU, which performs general processing operations, checks whether the parser is outputting the interrupt signal (sub-steps 44-1 and 44-2).

When it is detected that the parser in outputting the interrupt signal, the CPU reads the first two 32 bits of data of Set_OSD_pixel_format from the PCI FIFO and analyzes the read data (sub-steps 44-3 and 44-4).

The analysis result is stored to the CFR of the parser through the PCI interface (sub-step 44-5).

Next, it is checked whether the data stored in the CFR of the parser has 4/8-bit color format (step 45).

When the data stored in the CFR of the parser has the 4/8-bit color format, 4_bit_OSD_data and 8_bit_OSD_data from the 1394 FIFO are downloaded to the CLUT and address information of is 4_bit_OSD_data and 8_bit_OSD_data is read to output 16-bit pixel data (step 46 and 47). As 4_bit_OSD_data and 8_bit_OSD_data have information to display a rectangular area to be displayed, the parser receives this information and calculates a destination address of an actual system memory.

If the data stored in the CFR of the parser has the uncompressed 16-bit pixel format, Uncompressed_16_bit_data is read from the 1394 FIFO (step 48 and 49).

If the data stored in the CFR of the parser has OSD data of the Fill/Clear area, Fill_region_with_constant and Clear_OSD are read from the 1394 FIFO (step 50 and 51).

The data read in steps 47, 49 and 50 is stored in the CFR of the DMA based on the calculated destination address and size to be recorded in the system memory, and a matrix conversion process is applied to the data if necessary (steps 52 and 53).

The color-matrix-converted OSD pixel data is transmitted to the DMA to be stored at a predetermined location of the system memory and then an execution step returns to a new frame waiting mode (steps 54 and 55).

According to the present invention as described above, the graphic pixel data of subframes which occupy a wide bandwidth of the system bus, such as the CLUT, 4_bit_OSD_data, 8_bit_OSD_data, Uncompressed_16_bit_data, Fill_region_with_constant and Clear_OSD, are processed by the hardware method without passing them through the PCI bus. But, the first two 32 bits of data of Set_OSD_pixel_format, which is complicated, is processed in a software manner. Thus, the data processing scheme can utilize existing system resources and can reduce the system bandwidth, which allows a downsized hardware which occupies a reduced small area of a chip. Furthermore, it is further advantageous that modification and debugging of the apparatus and method of the present invention become easy.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A data processing apparatus comprising:
   a first data processing unit for analyzing predetermined data among graphic data received from the outside and processing the predetermined data to output control data, in response to an interrupt control signal;
   a second data processing unit for outputting the interrupt control signal to process the predetermined data when the graphic data is received from the outside and for calculating a destination address and a size of graphic data excluding the predetermined data to be output according to the control data; and
   a graphic processing unit for mixing video data with the graphic data, of which the destination address and the size are calculated, and outputting the mixed data.

2. The data processing apparatus as claimed in claim 1, further comprising a data interfacing unit for transferring data between the first data processing unit and the second data processing unit.

3. The data processing apparatus as claimed in claim 1, further comprising a memory for storing the size of the graphic data in the destination address calculated by the second data processing unit.

4. The data processing apparatus as claimed in claim 1, wherein the second data processing unit comprises:
   first storing means for storing the graphic data received from the outside based on IEEE 1394 standards;
   second storing means for storing predetermined data among the graphic data;
   a parser for generating an interrupt signal to transfer the predetermined data stored in the second storing means to the first data processing unit and for calculating the destination address and the size of the graphic data stored in the first storing means according to the control data from the first data processing unit;
   a color look-up-table for storing graphic data corresponding to an address processed by the parser;
   a color matrix converter for performing color space conversion with respect to the graphic data stored in the color look-up-table; and a controller for controlling the graphic data processed by the parsing means and the color matrix converter to be stored in the second storing means.

5. A data processing method using a combined software/hardware method, comprising the steps of:
- (a) generating an interrupt signal to output control data by analyzing predetermined data among graphic data received from the outside based on IEEE 1394 standards;
- (b) calculating a destination address and the size of the graphic data received from the outside based on IEEE 1394 standards according to the control data; and
- (c) storing the size of the graphic data in the destination address calculated in the step (b).

6. The data processing method as claimed in claim 5, wherein in a case where the control data has a 4/8-bit color format, a destination address therefor and a predetermined number of bits of graphic data are output to be matrix-converted in the calculating step and are stored in the memory.

7. The data processing method as claimed in claim 5, wherein in a case that the control data has an uncompressed 16-bit color format, a destination address therefor and the size thereof are calculated and the size of the graphic data is stored in the destination address of the memory.

8. The data processing method as claimed in claim 5, wherein in a case where the control data has OSD data of a fill/clear area, a destination address therefor and the size thereof are calculated and the size of the graphic data is stored in the destination address of the memory.

9. The data processing apparatus as claimed in claim 1, wherein the graphic data received from the outside is based on IEEE 1394 standards.

10. The data processing apparatus as claimed in claim 1, wherein the data processing apparatus is implemented in hardware using software.

* * * * *